United States Patent
Cosentino et al.

(10) Patent No.: US 11,991,278 B2
(45) Date of Patent: May 21, 2024

(54) SECRETS ROTATION FOR VEHICLES

(71) Applicant: Red Hat, Inc., Raleigh, NC (US)

(72) Inventors: Andrea Cosentino, Milan (IT); Paolo Antinori, Milan (IT)

(73) Assignee: RED HAT, INC., Raleigh, NC (US)

( * ) Notice: Subject to any disclaimer, the term of this patent is extended or adjusted under 35 U.S.C. 154(b) by 260 days.

(21) Appl. No.: 17/376,851

(22) Filed: Jul. 15, 2021

(65) Prior Publication Data
US 2023/0018251 A1    Jan. 19, 2023

(51) Int. Cl.
| | |
|---|---|
| *H04L 9/08* | (2006.01) |
| *G01S 19/42* | (2010.01) |
| *G06F 1/28* | (2006.01) |
| *H04L 9/40* | (2022.01) |
| *H04L 43/0829* | (2022.01) |
| *H04L 43/16* | (2022.01) |

(52) U.S. Cl.
CPC ............ *H04L 9/0891* (2013.01); *G01S 19/42* (2013.01); *G06F 1/28* (2013.01); *H04L 9/0819* (2013.01); *H04L 9/0894* (2013.01); *H04L 43/0829* (2013.01); *H04L 43/16* (2013.01); *H04L 63/0428* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 11,139,973 B2* | 10/2021 | Fujiwara | H04L 9/3226 |
| 2019/0149322 A1 | 5/2019 | Bar-Nahum et al. | |
| 2020/0099522 A1 | 3/2020 | Yang et al. | |
| 2020/0112439 A1* | 4/2020 | Kalaiselvam | H04L 9/3234 |
| 2020/0296671 A1* | 9/2020 | Bhattacharyya | H04W 80/02 |
| 2021/0058255 A1 | 2/2021 | Martins et al. | |
| 2021/0092604 A1 | 3/2021 | Fox et al. | |
| 2022/0139129 A1* | 5/2022 | Lerner | G07C 9/00309 340/5.61 |

FOREIGN PATENT DOCUMENTS

WO    2019067002 A1    4/2019

* cited by examiner

*Primary Examiner* — Brandon Hoffman
(74) *Attorney, Agent, or Firm* — Kilpatrick Townsend & Stockton LLP

(57) ABSTRACT

Systems and methods for message format communication among resource-constrained devices are generally described. In some examples, a first message sent by an edge computing device may be received. A determination may be made that the first message comprises a first data format identifier. A determination may be made that the first message comprises a first data format patch. A determination may be made that the first data format identifier was previously stored in a data structure in association with a first data format. In various examples, the first data format may be modified using the first data format patch to generate a first modified data format. The first modified data format may be stored in the data structure in association with the first data format identifier. In some examples, a payload of the first message may be read using the first modified data format.

20 Claims, 7 Drawing Sheets

SECRETS ROTATION FOR VEHICLES

BACKGROUND

The present disclosure generally relates to data encryption and secure communication between computing devices. Encryption and secure communication techniques are used by many different kinds of computing devices to prevent third party devices from reading communications between the computing devices. Limiting the number of messages that are encrypted with the same encryption key, over time, helps reduce the risk of a successful cryptanalysis brute-force attack.

SUMMARY

The present disclosure provides a new and innovative system, methods and apparatus for secret rotation for vehicles. In an example, a system that may be used to rotate secrets for network communication in vehicles is generally described. In various examples, the system may include at least one computing device deployed in a vehicle, a global positioning system (GPS) deployed in the vehicle, and non-transitory computer-readable memory deployed in the vehicle. In some examples, the non-computer-readable memory may store instructions that, when executed by at least one processor, are configured to determine, using the GPS, a first location of the vehicle at a first time. In various examples, the instructions may be further configured to determine a first distance threshold. In some other examples, the instructions may be further configured to determine, using the GPS, a second location of the vehicle at a second time. In other examples, the instructions may be further configured to determine, based on the first location and the second location, that the vehicle has traveled a distance that exceeds the first distance threshold. In various other examples, the instructions may be configured to send a first request to a remote computing device. In some cases, the first request being a request to update an encryption key used by the at least one computing device for encrypting data. In some examples, the first request may be sent based at least in part on the distance exceeding the first distance threshold.

In another example, a method of rotating secrets for a vehicle are generally described. In some examples, the method may include determining, using a GPS, a first location of the vehicle at a first time. In further examples, the method may include determining a first distance threshold stored in memory. In yet other examples, the method may include determining, using the GPS, a second location of the vehicle at a second time. In still other examples, the method may include determining, based on the first location and the second location, that the vehicle has traveled a distance that meets or exceeds the first distance threshold. In various further examples, the method may include sending a first request to a remote computing device via a first communication channel, the first request being a request to update an encryption key used to encrypt data, wherein the first request is sent based at least in part on the distance meeting or exceeding the first distance threshold.

In yet another example, a method of secret rotation and encryption for vehicles is generally described. In some examples, the method may include determining a first distance threshold stored in a non-transitory computer-readable memory associated with a vehicle. In some examples, the method may include determining that the vehicle has traveled a distance that meets or exceeds the first distance threshold. In some examples, the method may include sending a first request to a remote computing device via a first communication channel. In various examples, the first request may be a request for an encryption key used to encrypt data. In various cases, the first request may be sent based at least in part on the distance exceeding the first distance threshold. In some examples, the method may include receiving the encryption key from the remote computing device. In at least some cases, the method may include encrypting first data using the encryption key to generate first encrypted data. In various examples, the method may include sending the first encrypted data to a second computing device over a network.

Additional features and advantages of the disclosed methods, devices, and/or systems are described in, and will be apparent from, the following Detailed Description and the Figures.

DETAILED DESCRIPTION OF EXAMPLE EMBODIMENTS

Figure 1:
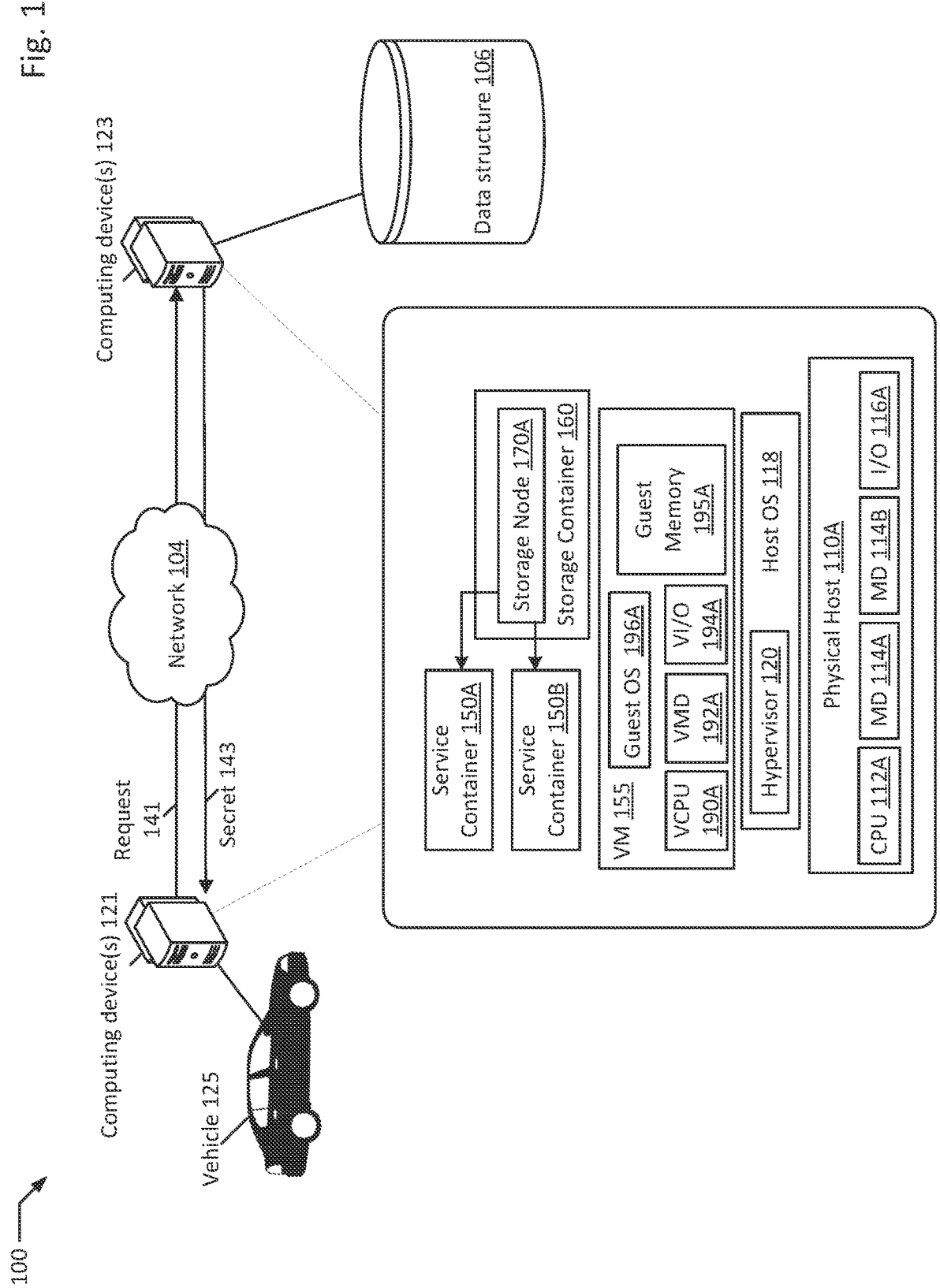
FIG. 1 is a block diagram of a computer communication system, according to various examples of the present disclosure.

In modern vehicles, such as automobiles, many vehicles include computing devices that are able to communicate with other, remote computing devices over communication networks. In order to provide secure communication, many such vehicle computing devices share secrets (e.g., encryption keys) with a central system (e.g., a vault service and/or other encryption key provider). Encryption keys (sometimes referred to as "secrets" or "shared secrets") enable secure communication with other computing devices that are also privy to the encryption key. For example, two computing devices that each possess the same encryption key (e.g., a private key used in symmetric encryption) may allow the devices to encrypt and decrypt data sent to and received from the other device enabling secure communication. In the context of automobiles, such secure communication may be used for a variety of purposes, such as system updates, traffic information, etc.

Use of shared secrets may subject vehicle systems and/or centralized systems with which the vehicle systems share secrets to malicious attacks. For example, if an attacker is able to intercept or otherwise retrieve a shared secret, the attack can use a man-in-the-middle attack to intercept and decrypt messages from each party and interject new, unauthorized messages between the parties. In order to mitigate the risk of such attacks, rotation of secrets over time is an advisable security practice. Rotation of the encryption key may limit the number of messages that are vulnerable to compromise.

Various secret rotation algorithms typically function by triggering a secret rotation by a client device. In response to a request for an updated secret, a centralized system (e.g., a key vault service) generates a new secret and stores it in a key store of the centralized system. The centralized system labels the previous secret that was in use prior to the secret rotation as "old." The centralized system similarly labels the new, updated secret with a "new" label and send the updated secret to the client device. The centralized system initiates a timer. Prior to expiration of the timer, both old and new secrets may be used to encrypt and/or decrypt messages. Upon receipt of an acknowledgement message from the client (e.g., an "ACK" message) the old secret is deleted. Until expiration of the timer the centralized system repeatedly attempts to send the new secret to the client until receipt of the acknowledgement message. Once the timer expires, the centralized system deletes the old secret. At this point, only the new secret is valid for communication with the centralized system. The new secret is valid until the next secret rotation, at which point the process repeats. The more often a shared secret is used during communication with a remote computing device, the higher the risk that an attacker is able to retrieve the secret, potentially resulting in a man-in-the-middle attack.

To mitigate the risk of such attacks, described herein are secret rotation techniques that may be used in vehicles (e.g., vehicles that include systems with network communication capability). Vehicles may include any devices that include sensors effective to determine the device's location such that a displacement between one location and another location may be determined. The various techniques described herein may be used to trigger secret rotation based on a distance a vehicle has traveled since the prior secret rotation. Additionally, to mitigate the risk that a vehicle loses power prior to completion of a secret rotation, the distance threshold used to trigger secret rotation may be modified based on the current battery-charge level of the vehicle. For example, when the battery charge is close to being depleted, the distance threshold may be reduced so that secret rotation can be completed prior to loss of power. Further, the distance threshold used to trigger secret rotation may be modified based on an amount of noise detected on the communication channel between the vehicle computing device and the centralized system. For example, the distance threshold may be decreased when the noise experience on the communication channel (e.g., packet loss) is above a pre-defined threshold. Similarly, the distance threshold may be increased when the level of noise decreases.

Limiting the number of messages that are encrypted with the same encryption key helps to prevent brute force cryptanalysis attacks often used by attackers. Linking secret rotation with geographical positioning of a vehicle reduces the number of messages encrypted with the same key. Additionally, many attacks occur from stationary locations (e.g., while a vehicle is within range of an attacker's computing device). Triggering a secret rotation as the vehicle moves away from the attacker device limits the utility of an attacker obtaining a key to the time in which the vehicle is in close proximity to the vehicle. For example, a vehicle may be stationary at a refueling station while being attacked. Under traditional paradigms of secret rotation (e.g., a time threshold used to trigger secret rotation), the timing of the next secret rotation may come too late. However, using a GPS location of the vehicle to trigger the secret rotation may allow the secret to be rotated as the car moves away from the refueling station—mitigating the risk of a successful man-in-the-middle attack and/or limiting the impact of a successful attack (by triggering the secret rotation sooner, relative to timer-based rotation, based on GPS location change of the vehicle).

FIG. 1 is a block diagram of a computer communication system 100, according to various examples of the present disclosure. A vehicle 125 may include one or more embedded systems, such as one or more computing device(s) 121. In various examples, the computing device(s) 121 may include network communication hardware effective to allow the vehicle 125 to communicate over a network 104. In various examples, the computing device(s) 121 may include network communication hardware effective to allow the vehicle 125 to communicate over a network 104 (e.g., a wide area network (WAN) such as the Internet).

The one or more computing device(s) 121 may share secrets (e.g., encryption keys) with remote computing device(s) 123. Computing device(s) 123 may be, for example, computing devices associated with an original equipment manufacturer (OEM) of the vehicle 125. The computing device(s) 123 may communicate with the computing device(s) 121 of the vehicle 125 in order to provide software updates and/or communicate various data (e.g., traffic information, local shopping options, entertainment options, weather information, service alerts, etc.) to the vehicle 125. In various examples, the data sent between computing device(s) 121 and computing device(s) 123 may be encrypted using a shared secret (e.g., a private encryption key used in symmetric encryption). Further, in various examples, the shared secret may be rotated according to the various techniques described herein so that the shared encryption key is changed over time to mitigate the risk of a successful man-in-the-middle attack.

In the example of FIG. 1, when a secret rotation is triggered by vehicle 125, the computing device(s) 121 send a request 141 over network 104 to computing device(s) 123. The request 141 may be a request for a new secret 143 (e.g., encryption key). Upon receipt of the request, the computing device(s) 123 may generate a new encryption key and may send the new encryption key to the computing device(s) 121 via network 104. Additionally, the computing device(s) 123 may store the new encryption key in data structure 106 for future use. As described above, the computing device(s) 123 may initiate a timer upon generating the new encryption key. Until expiration of the timer, both the new and old encryption keys may remain valid. If the computing device(s) 123 receive an acknowledgement message from computing device(s) 121 indicating that the new encryption key has been received by vehicle 125, the old encryption key may be deleted. Thereafter only the new encryption key may be valid. Until expiration of the timer, the computing device(s) 123 may repeatedly attempt to send the new encryption key to computing device(s) 121 until either an acknowledgement message is received or until expiration of the timer. Upon expiration of the timer the old encryption key may be deleted and the new encryption key may be used subsequently.

The computing device(s) 121 and 123 may be effective to execute software that is configured to perform the various secret rotation techniques described herein. FIG. 1 depicts example components that may be included in various implementations of computing device(s) 121 and/or computing device(s) 123. For example, computing device(s) 121 and/or computing device(s) 123 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Computing device(s) 121 and/or computing device(s) 123 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage may be deployed in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

Figure 2:
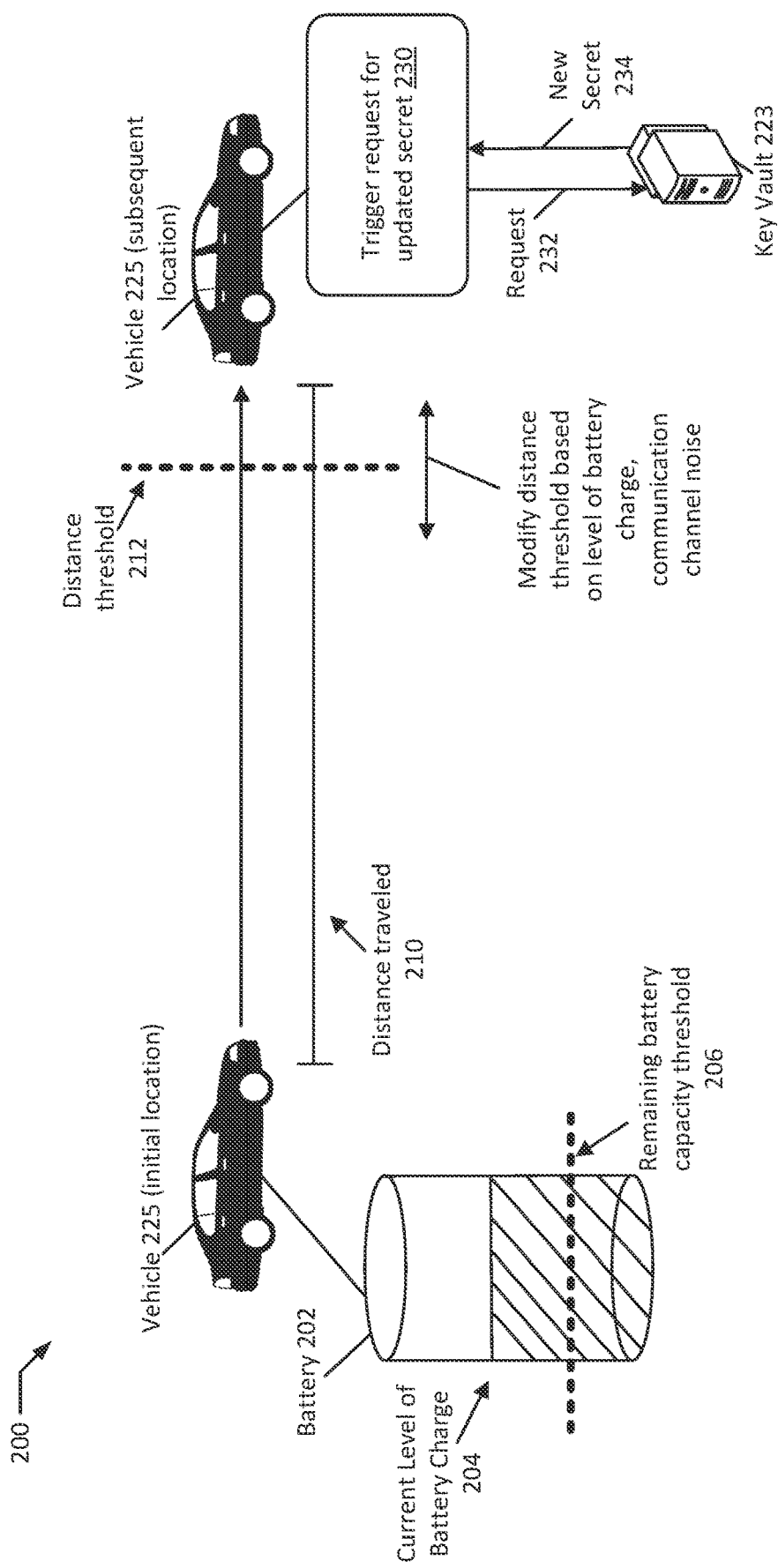
FIG. 2 is a diagram illustrating secret rotation for a vehicle, according to various examples of the present disclosure.

FIG. 2 is a diagram 200 illustrating secret rotation for a vehicle 225, according to various examples of the present disclosure. In various examples, a secret rotation may initially be triggered by vehicle 225 when the vehicle is at a first location. In FIG. 2, the first location is described as an "initial location," however the vehicle may be at any location at the time of a first secret rotation. Thereafter, distance traveled 210 may be tracked by the vehicle 225. Depending on the implementation, the distance traveled may be tracked using GPS location information, odometer information, and/or any other means of calculating a distance traveled by the vehicle. In some examples, a secret rotation may be triggered when the distance traveled 210 by the vehicle 225 since the last secret rotation exceeds a distance threshold 212.

The distance threshold 212 may be implemented in various ways. For example, in one embodiment, the distance threshold may be instantiated as a radius extended outward from the location of the vehicle during the last secret rotation. In such examples, the secret rotation may be triggered when the vehicle leaves the circle defined by the distance threshold 212 radius (extending outward from the location of the last secret rotation). In such examples, the vehicle may travel within the circle defined by the distance threshold 212 radius and a secret rotation may not be triggered until the vehicle 225 has left the circle (as determined using GPS). However, in some examples, a secret rotation may be triggered after a threshold amount of time since the last secret rotation regardless of whether the vehicle has traveled beyond the distance threshold.

In another example embodiment, the distance threshold may be instantiated based on a total distance traveled by the vehicle 225 (e.g., as determined using the vehicle 225's odometer) regardless of whether the displacement between the location of the vehicle at the time of the last secret rotation and the current location of the vehicle has changed by a significant amount. For example, the distance threshold 212 may be 5 miles. Regardless of whether the vehicle 225 has traveled more than 5 miles in a straight line or has driven back and forth along a short track for a distance that exceeds 5 miles, the secret rotation may be triggered. Regardless of how the distance threshold is implemented, once the distance traveled by vehicle 225 since the last secret rotation meets or exceeds the distance threshold 212, vehicle 225 may trigger a request for updated secret (action 230) by sending request 232 to a central system (e.g., key vault service 223) and by receiving, in response, a new secret 234.

In various examples, the distance threshold 212 may be dynamically modified based on various factors. For example, the distance threshold 212 may be dynamically modified based on a current level of battery charge of vehicle 225 and/or based on an amount of noise detected on a communication channel established between vehicle 225 and key vault 223.

For example, a battery 202 of vehicle 225 may supply power to computing systems of vehicle 225 that encrypt data using secrets exchanged between vehicle 225 and key vault 223. In various examples, there may be a remaining battery capacity threshold 206 associated with the vehicle 225 and/or with the battery 202. The computing systems of the vehicle 225 may monitor the charge level of the battery 202 to determine a current level of battery charge 204. If the current level of battery charge 204 is less than or equal to the remaining battery capacity threshold 206, the computing systems of the vehicle 225 may decrease the distance threshold 212. For example, the computing systems may modify the distance threshold 212 to half the previous value (or any other desired percentage of the previous value). Accordingly, if the current distance threshold 212 is 10 miles and the current level of battery charge 204 falls below the remaining battery capacity threshold 206, the vehicle 225 may update the distance threshold 212 to 5 miles. In this example, if the vehicle 225 has driven 6 miles since the last secret rotation and the current level of battery charge 204 falls below the remaining battery capacity threshold 206, the distance threshold 212 will be updated to 5 miles and a secret rotation will be triggered since the vehicle has traveled a distance that exceeds the distance threshold since the last secret rotation. In various examples, decreasing the distance threshold 212 when the battery charge level is low may allow the vehicle to complete a secret rotation prior to loss of power to the computing systems of the vehicle 225.

Various other remaining battery capacity thresholds 206 may be used apart from the static threshold example described above. For example, the amount by which to reduce the distance threshold 212 may be inversely proportional to the current level of battery charge remaining. In such examples, the lower the current level of battery charge, the more the distance threshold 212 may be decreased. Further, when the battery is charged (or replaced with a fully-charged battery) and the current level of battery charge 204 goes from being at or below the remaining battery capacity threshold 206 to being above the remaining battery capacity threshold 206, the distance threshold 212 may be increased. For example, the distance threshold 212 may be set to a predefined maximum value.

In some other examples, computing systems of vehicle 225 may monitor the communication channel between vehicle 225 and key vault 223 (or any other central system with which the secret rotation is performed). In various examples, if the noise in the communication channel exceeds a predefined threshold, the distance threshold 212 may be decreased. In various examples, noise may be measured in terms of packets lost per unit of time. Accordingly, if the number of packets lost over a period of time exceeds a threshold value, the distance threshold 212 may be decreased. In various examples, the distance threshold 212 may be iteratively decreased while the noise on the communication channel violates the threshold and may be iteratively increased during period of time in which the packet loss on the communication channel is below the threshold packet loss.

In various further implementations, the various thresholds described herein for determining when to initiate secret rotation may be hierarchical. For example, the noise threshold related to decreasing the distance threshold 212 when packets loss exceeds an acceptable level may be applied only when the current level of battery charge 204 is less than the remaining battery capacity threshold 206. Similarly, the noise threshold related to increasing the distance threshold when the noise on the communication channel improves may be applied only when the current level of battery charge 204 is less than the remaining battery capacity threshold 206. In other examples, the thresholds may be applied independently of one another, depending on the desired implementation.

Figure 3:
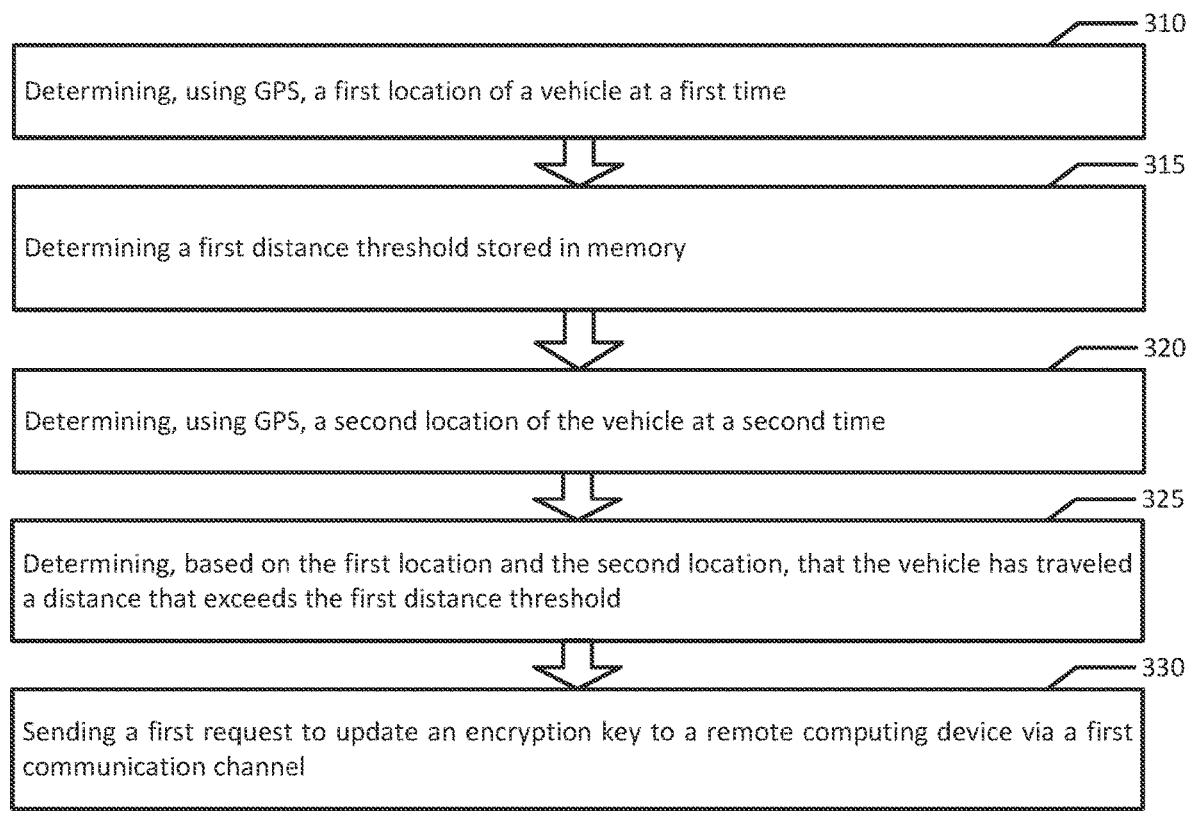
FIG. 3 is flowchart illustrating an example process for triggering a request for an encryption key by a vehicle according to an example of the present disclosure.

FIG. 3 is flowchart illustrating an example process 300 for triggering a request for an encryption key by a vehicle according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes determining, using GPS, a first location of a vehicle at a first time (block 310). For example, the GPS location of the vehicle may be determined at a time that the vehicle computing device receives a shared secret from the central computing system (e.g., at the time central computing device receives an acknowledgement message from the vehicle computing device acknowledging that the shared secret has been received by the vehicle computing device). The first location may be stored in a memory of the vehicle computing system and used to determine if the distance threshold has been met or exceeded.

In an example, the process 300 may include determining a first distance threshold stored in memory (block 315). For example, the vehicle computing system may store a distance threshold (e.g., distance threshold 212) in a memory. The distance threshold may be used to determine when to trigger a secret rotation by the vehicle computing device. For example, the vehicle computing device determines that the vehicle has traveled a distance that meets or exceeds the distance threshold since a new secret was received from the central computing device, the vehicle computing device may send a request for the new shared secret (e.g., an encryption key).

In an example, the process 300 may include determining, using GPS, a second location of the vehicle at a second time (block 320). For example, the GPS location of the vehicle may be determined periodically to determine if the vehicle has traveled a distance that meets or exceeds the first distance threshold.

In an example, the process 300 may include determining, based on the first location and the second location, that the vehicle has traveled a distance that exceeds the first distance threshold (block 325). For example, the vehicle computing device may determine if the difference between the second location and the first location exceeds the first distance threshold. As described herein, the first distance threshold may be modified based on various factors such as a current level of battery charge and/or based on noise detected on the communication channel between the vehicle computing device and the central computing device (e.g., the key vault service).

In an example, the process 300 may include sending a first request to update an encryption key to a remote computing device via a first communication channel (block 330). In various examples, when the vehicle has traveled a distance that exceeds the first distance threshold, the vehicle may send a request to the central computing device for a new shared secret. In response, the central computing device (e.g., computing device(s) 123) may generate a new encryption key and may send the encryption key over a network to the vehicle computing device.

Figure 4:
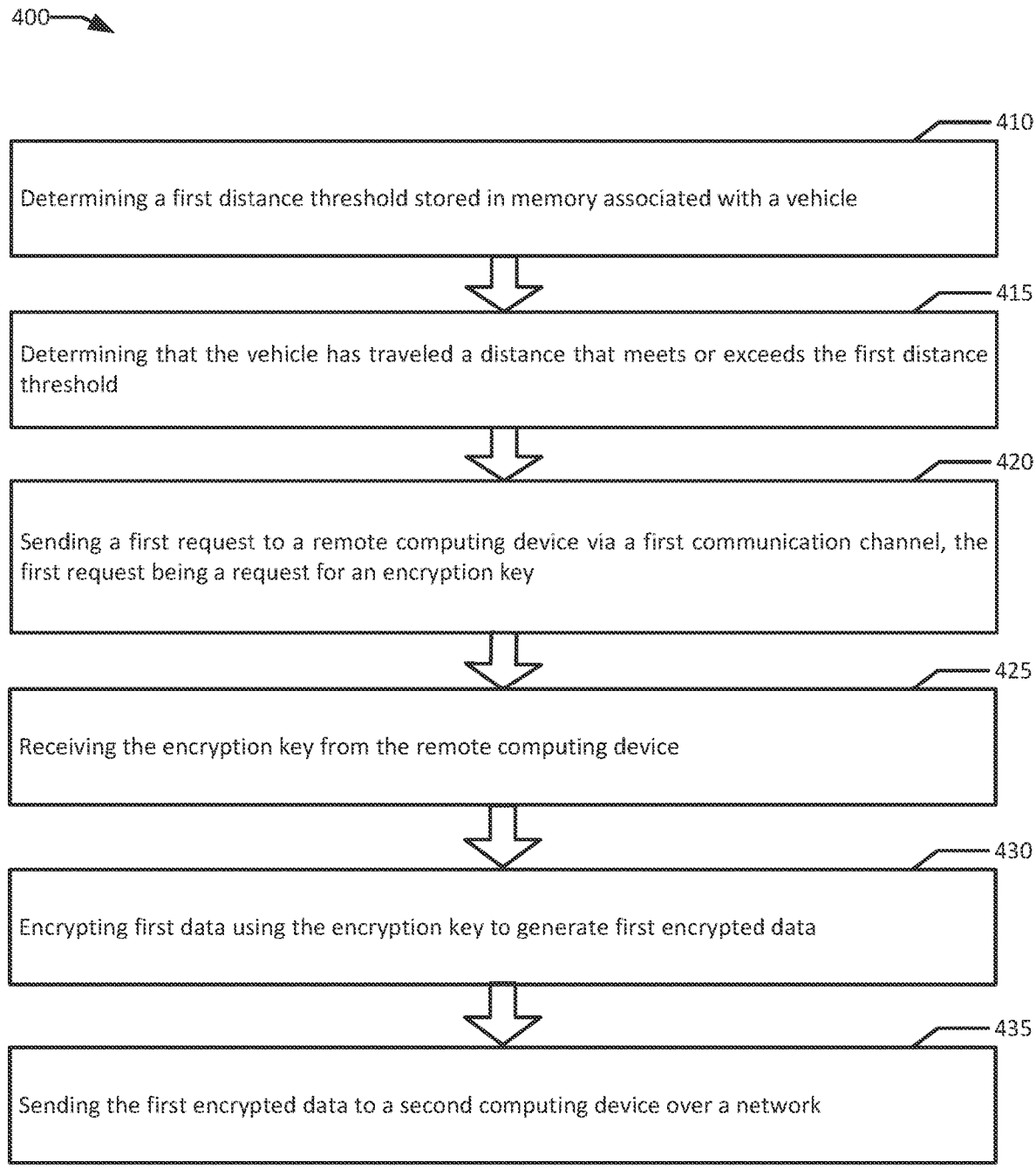
FIG. 4 is flowchart illustrating an example process for receiving an encryption key by a vehicle and encrypting data according to an example of the present disclosure.

FIG. 4 is flowchart illustrating an example process 400 for receiving an encryption key by a vehicle and encrypting data according to an example of the present disclosure. Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 400 includes determining a first distance threshold stored in memory associated with a vehicle (block 410). For example, the vehicle computing system may store a distance threshold (e.g., distance threshold 212) in a memory. The distance threshold may be used to determine when to trigger a secret rotation by the vehicle computing device. For example, the vehicle computing device determines that the vehicle has traveled a distance that meets or exceeds the distance threshold since the new secret was received from the central computing device, the vehicle computing device may send a request for a new shared secret (e.g., an encryption key). The distance threshold may be implemented as a radius extending outward from the last location at which the vehicle received a shared secret from the central computing device. Accordingly, the vehicle may meet or exceed the threshold when the vehicle travels outside of the circle defined by the radius (e.g., as detected using GPS). In another example, the distance threshold may be implemented as an elapsed distance (e.g., based on odometer readings). For example, the distance threshold may be 5 km and may be triggered when ≥5 km have elapsed since the odometer reading from when the last secret was received.

The example process 400 may include determining that the vehicle has traveled a distance that meets or exceeds the first distance threshold (block 415). For example, the GPS and/or odometer of the vehicle may be used to determine whether the vehicle has traveled a distance that meets or exceeds the threshold, as described above.

The example process 400 may include sending a first request to a remote computing device via a first communication channel; the first request being a request for an encryption key (block 420). For example, the vehicle computing device may send a request to a centralized computing system (e.g., a key vault service) for a new encryption key that may be used to encrypt data sent between the vehicle computing device and the centralized computing system. In an example, the request may be sent based at least in part on the distance traveled by the vehicle since the last secret rotation exceeding a distance threshold.

The example process 400 may include receiving the encryption key from the remote computing device (block 425). The encryption key may be received via the first communication channel. In various examples, the vehicle computing device may send an acknowledgement message indicating that the encryption key was successfully received by the vehicle computing device. After receipt of the acknowledgement message, the central computing device may delete the previous ("old") encryption key and begin using the newly-sent encryption key.

The example process 400 may include encrypting first data using the encryption key to generate first encrypted data (block 430). Subsequent communications sent by the vehicle computing device to the central computing device via the first communication channel may be encrypted using the encryption key received at block 425. Rotating the encryption key may mitigate risk associated with a man-in-the-middle attack. Even if an attacker is able to successfully retrieve an encryption key, the encryption key may only remain viable for a relatively short amount of time until the vehicle travels a distance that exceeds the distance threshold and a new encryption key is sent. The example process 400 may include sending the first encrypted data to a second computing device over a network (block 435). For example, the vehicle computing device may send the first encrypted data over a network to the central computing device (e.g., encrypted location information, etc.).

Figure 5:
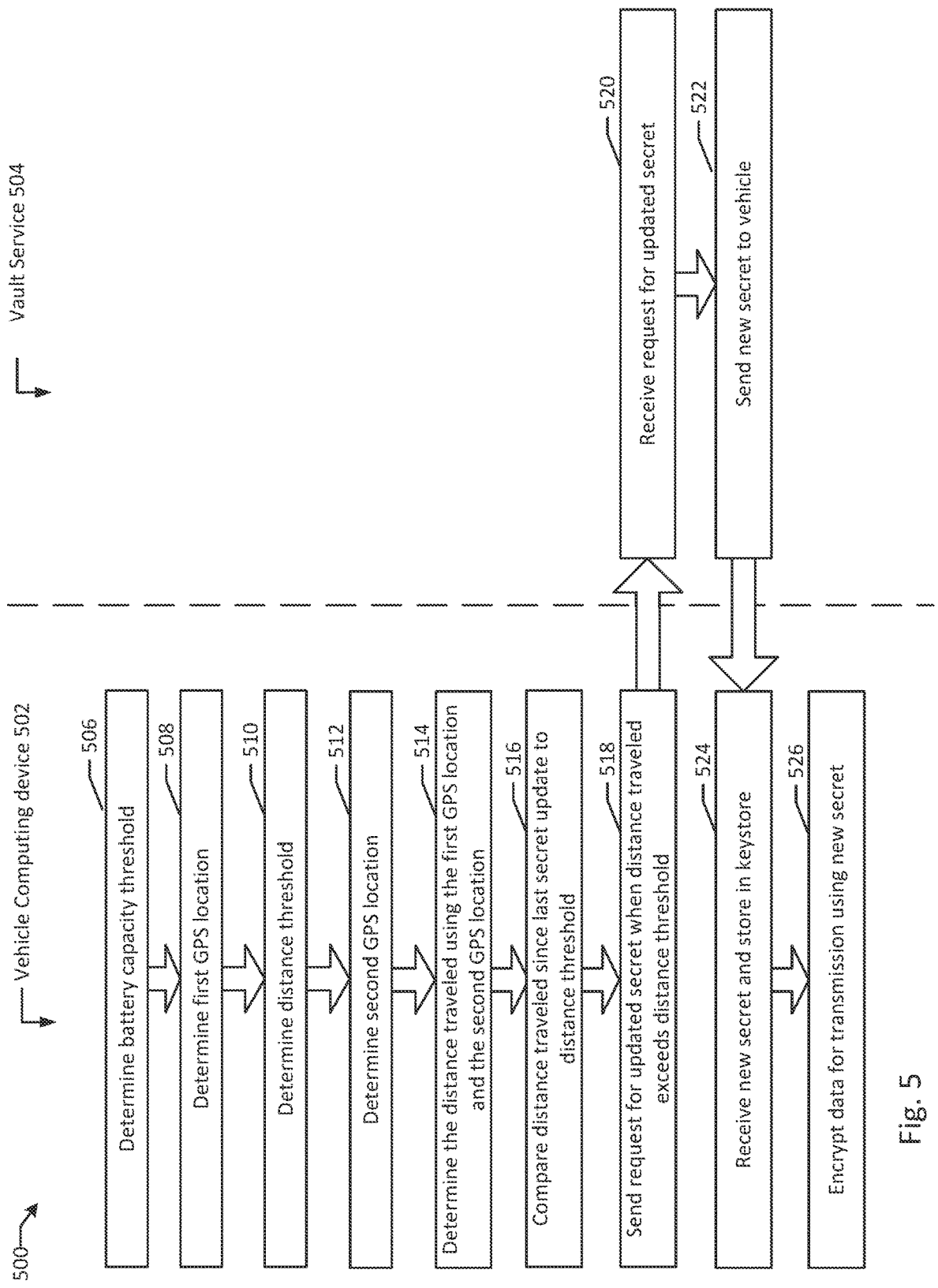
FIG. 5 illustrates a flow diagram of requesting and receiving an encryption key by a vehicle according to various aspects of the present disclosure.

FIG. 5 illustrates a flow diagram 500 of requesting and receiving an encryption key by a vehicle according to various aspects of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example depicted in FIG. 5, vehicle computing device 502 may determine a battery capacity threshold (block 506). The battery capacity threshold may indicate a percentage of remaining battery life. If a current level of charge of a battery powering the vehicle computing device falls below the battery capacity threshold, the distance threshold may be decreased, as described below. Vehicle computing device 502 may determine a first GPS location (block 508). The first GPS location may correspond to the location of the vehicle at the last time a shared secret (e.g., an encryption key) was received from vault service 504. Vehicle computing device 502 may determine a distance threshold (block 510). The distance threshold may indicate a maximum distance from the first GPS location. When the vehicle travels a distance from the first GPS location that meets or exceeds the distance threshold, the vehicle computing device 502 may trigger a secret rotation, as described herein.

Vehicle computing device 502 may determine a second GPS location (block 512). In various examples, the vehicle computing device 502 may periodically determine the second GPS location in order to determine if the vehicle has traveled a distance from the first GPS location that meets or exceeds the distance threshold. Vehicle computing device 502 may determine the distance traveled using the first GPS location and the second GPS location (block 514). For example, the vehicle computing device 502 may determine a displacement between a two-dimensional coordinate representing the first GPS location and two-dimensional coordinate representing the second GPS location. Vehicle computing device 502 may compare the distance traveled since the last secret update to the distance threshold (block 516). For example, the vehicle computing device may determine if the current distance traveled since the last secret update exceeds the distance threshold.

When the distance traveled meets or exceeds the distance threshold, the vehicle computing device 502 may send a request for an updated secret to a vault service (block 518). The vault service 504 may be a secure memory that may generate and/or store encryption keys. In various examples, a central computing device (e.g., a central computing device associated with an OEM) may implement and/or may be configured in communication with the vault service 504. The vault service 504 may receive the request for the updated secret (block 520) from the vehicle computing device 502. The vault service 504 may generate and/or may retrieve a previously-generated secret (e.g., an encryption key) and may send the new secret to the vehicle (block 522). In various examples, the encryption key may be generated using a random number generator, a pseudorandom number generator, seed data, etc. In various examples, cryptographic algorithms used by the vehicle and/or the central computing device may include symmetric-key algorithms (e.g., data encryption standard (DES), advanced encryption standard (AES) and/or asymmetric key algorithms (e.g., transport layer security (TLS), secure shell protocol (SSH), etc.).

Vehicle computing device 502 may receive the new secret and store the new secret in a keystore in memory (block 524). For example, the vehicle computing device 502 may have a set of secure memory locations (known as a keystore) for storing cryptographic information such as encryption keys. The vehicle computing device 502 may store the new secret in the keystore. Thereafter, the vehicle computing device may encrypt data for transmission using the new secret (block 526).

Figure 6:
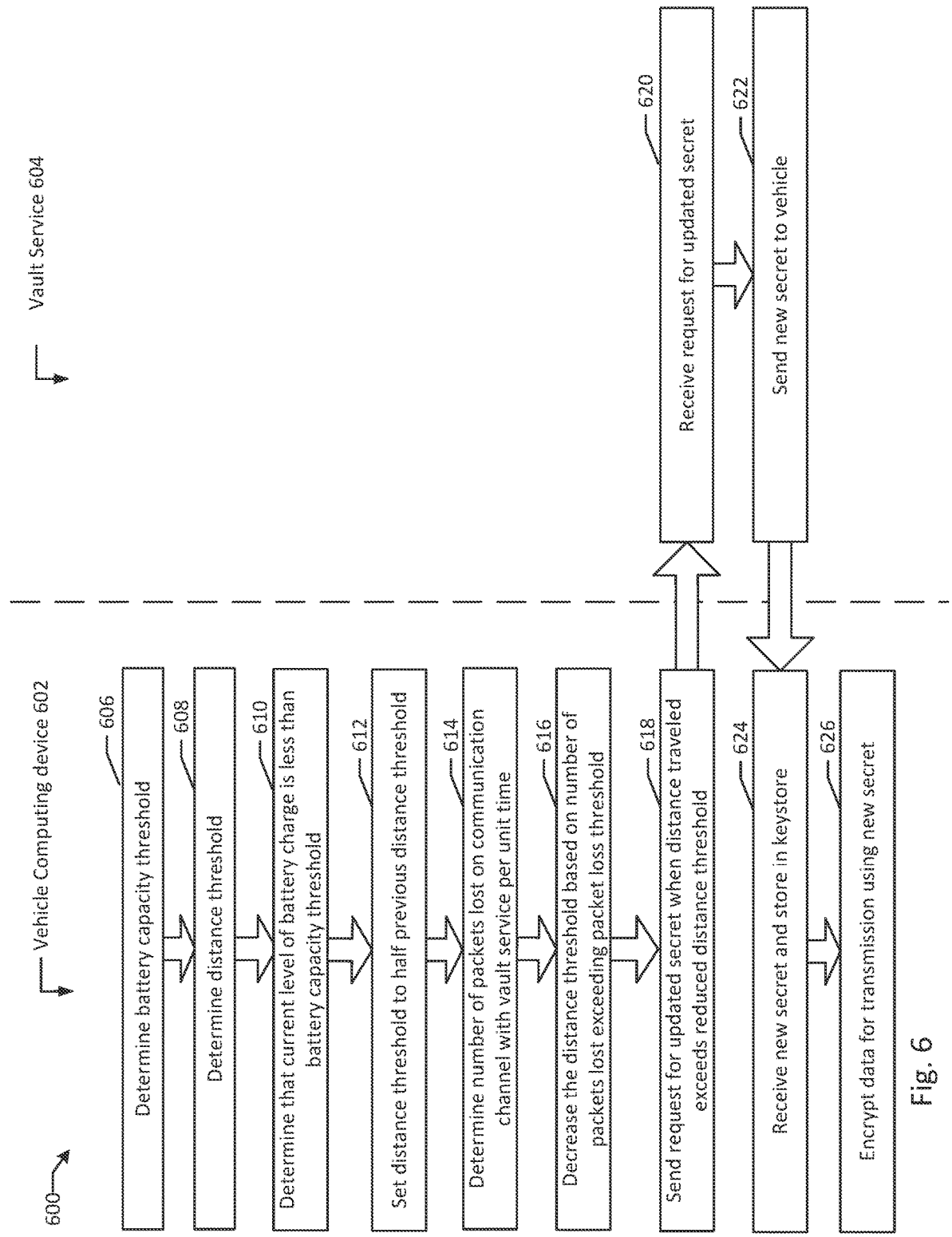
FIG. 6 illustrates a flow diagram of an example modification of a distance threshold for requesting an encryption key in accordance with various aspects of the present disclosure.

FIG. 6 illustrates a flow diagram 600 of an example modification of a distance threshold for requesting an encryption key in accordance with various aspects of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example flow diagram 600, vehicle computing device 602 may determine a battery capacity threshold (block 606). The battery capacity threshold may indicate a percentage of remaining battery life. If a current level of charge of a battery powering the vehicle computing device falls below the battery capacity threshold, the distance threshold may be decreased, as described below. Vehicle computing device 602 may determine a distance threshold (block 608). The distance threshold may indicate a maximum distance of travel by the vehicle since the last secret was received from the vault service 604. The distance threshold may be used to trigger a request by vehicle computing device 602 for a secret rotation (e.g., a new secret).

Vehicle computing device 602 may determine that the current level of battery charge is less than the battery capacity threshold (block 610). For example, the battery capacity threshold may be 15% charged. The current level of battery charge may be 14% (or any other percentage less than 15%). Vehicle computing device 602 may set the distance threshold to half the previous distance threshold (block 612). In the example of FIG. 6, when the current level of battery charge is less than the battery capacity threshold, the vehicle computing device may halve the distance threshold. This may result in triggering of a secret rotation sooner, reducing the likelihood that the battery charge is depleted prior to completion of the secret rotation.

Vehicle computing device 602 may determine the number of packets lost on a communication channel with vault service 604 over a given amount of time (block 614). This may be a periodic operation performed at a predefined frequency (e.g., every 10 seconds, 30 seconds, 2 seconds, etc.). Vehicle computing device 602 may determine that the number of packets lost on the communication channel exceeds a packet loss threshold and may decrease the distance threshold in response (block 616). This may be an incremental operation whereby as long as the noise on the communication channel persists and exceeds the applicable threshold (e.g., a packet loss threshold) the distance threshold may be incrementally decreased (e.g., by 0.1 km, etc.).

Vehicle computing device 602 may send a request for an updated secret when the distance traveled exceeds the current reduced distance threshold (block 618). Since the distance threshold has been decreased, the vehicle requests a secret rotation at an earlier time relative to scenarios in which the battery charge is above the battery capacity threshold and/or scenarios in which the communication channel used to communicate with the vault service 604 is relatively free of noise.

The vault service 604 may receive the request for the updated secret (block 620) from the vehicle computing device 602. The vault service 604 may generate and/or may retrieve a previously-generated secret (e.g., an encryption key) and may send the new secret to the vehicle (block 622). Vehicle computing device 602 may receive the new secret and store the new secret in a keystore in memory (block 624). For example, the vehicle computing device 602 may have a set of secure memory locations (known as a keystore) for storing cryptographic information such as encryption keys. The vehicle computing device 602 may store the new secret in the keystore. Thereafter, the vehicle computing device may encrypt data for transmission using the new secret (block 626).

Figure 7:
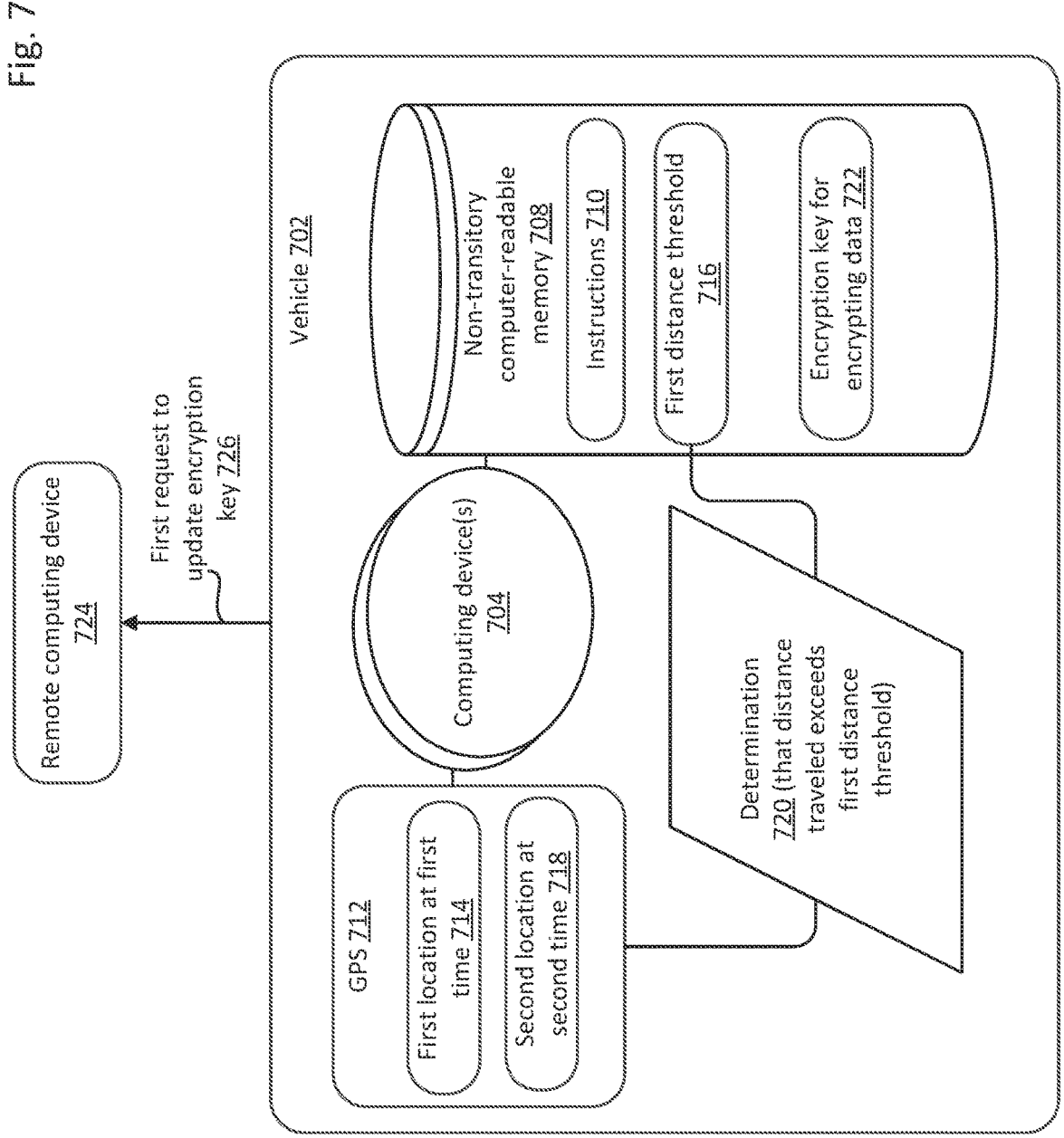
FIG. 7 is block diagram of an example system for requesting an encryption key by a vehicle according to an example of the present disclosure.

FIG. 7 is block diagram of an example system 700 for requesting an encryption key for encrypting data 722 by a vehicle 702 according to an example of the present disclosure. The system 700 may include a vehicle 702 including one or more computing device(s) 704, non-transitory computer-readable memory 708, and a GPS 712. The non-transitory computer-readable memory 708 may store instructions 710 that may, when executed by at least one process, be configured to perform various techniques described herein related to secret rotation for vehicles.

The GPS may determine a first location at a first time 714 for the vehicle 702. The first time may be, for example, the time at which a previous secret or other encryption key was received by computing device(s) 704 of vehicle 702 from remote computing device 724. The vehicle 702 and/or computing device(s) 704 may determine a first distance threshold 716 (e.g., stored in non-transitory computer-readable memory 708). The first distance threshold 716 may be used to determine whether the computing device(s) 704 should send first request to update encryption key 726 to remote computing device 724.

The GPS may determine a second location at a second time 718 for the vehicle. In various examples, the second location may be repeatedly determined in order to determine if the distance traveled by the vehicle 702 meets or exceeds the first distance threshold 716. As such, in the example of FIG. 7, a determination 720 may be made that the distance traveled by vehicle 702 exceeds the first distance threshold 716. The determination 720 may be made based on the first location and the second location determined by the GPS 712. In various examples, the instructions 710 may be further configured to send first request to update encryption key 726 to remote computing device 724 based at least in part on the determination 720 that the distance traveled exceeds the first distance threshold 716.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a system comprises at least one computing device deployed in a vehicle, a global position system (GPS) deployed in the vehicle, and non-transitory computer-readable memory deployed in the vehicle. The non-transitory computer-readable memory may store instructions that, when executed by at least processor, are configured to: determine, using the GPS, a first location of the vehicle at a first time; determine a first distance threshold; determine, using the GPS, a second location of the vehicle at a second time; determine, based on the first location and the second location, that the vehicle has traveled a distance that exceeds the first distance threshold; and send a first request to a remote computing device, the first request being a request to update an encryption key used by the at least one computing device for encrypting data, wherein the first request is sent based at least in part on the distance exceeding the first distance threshold.

In accordance with a 2nd example aspect of the present disclosure, which may be used in combination with any one or more of other aspects described herein (e.g., the 1st aspect), wherein the non-transitory computer-readable memory stores further instructions that, when executed by the at least one processor, are further configured to: encrypt first data using a first encryption key stored in the non-transitory computer-readable memory to generate first encrypted data; send the first encrypted data to at least one other computing device over a network; receive a second encryption key in response to the first request; store the second encryption key in the non-transitory computer-readable memory; and encrypt second data using the second encryption key to generate second encrypted data.

In accordance with a 3rd example aspect of the present disclosure, which may be used in combination with any one or more of other aspects described herein (e.g., the 1st aspect), wherein the non-transitory computer-readable memory stores further instructions that, when executed by the at least one processor, are further configured to: determine that the GPS system is currently disabled; and send a notification to the at least one computing device deployed in the vehicle, wherein the notification requests that the GPS system be enabled.

In accordance with a 4th example aspect of the present disclosure, which may be used in combination with any one or more of other aspects described herein (e.g., the 1st aspect), wherein the non-transitory computer-readable memory stores further instructions that, when executed by the at least one processor, are further configured to: determine a remaining battery capacity threshold for a battery that supplies power to the at least one computing device;

determine a current level of battery charge of the battery; and modify the first distance threshold based at least in part on the remaining battery capacity threshold and the current level of battery charge.

In accordance with a 5th example aspect of the present disclosure, which may be used in combination with any one or more of other aspects described herein (e.g., the 4th aspect), wherein the non-transitory computer-readable memory stores further instructions that, when executed by the at least one processor, are further configured to: determine that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

In accordance with a 6th example aspect of the present disclosure, which may be used in combination with any one or more of other aspects described herein (e.g., the 1st aspect), wherein the first request is sent to the remote computing device via a first communication channel, and wherein the non-transitory computer-readable memory stores further instructions that, when executed by the at least one processor, are further configured to: determine a current level of packet loss experienced during communication via the first communication channel; and decrease the first distance threshold to generate a second distance threshold that is less than the first distance threshold based at least in part on the current level of packet loss.

In accordance with a 7th example aspect of the present disclosure, which may be used in combination with any one or more of other aspects described herein (e.g., the 1st aspect), wherein the first request is sent to the remote computing device via a first communication channel, and wherein the non-transitory computer-readable memory stores further instructions that, when executed by the at least one processor, are further configured to: determine a current level of packet loss experienced during communication via the first communication channel; determine a threshold level of packet loss; and decrease the first distance threshold to generate a second distance threshold that is less than the first distance threshold based at least in part on the current level of packet loss exceeding the threshold level of packet loss.

In accordance with an 8th example aspect of the present disclosure, which may be used in combination with any one or more of other aspects described herein (e.g., the 1st aspect), wherein the non-transitory computer-readable memory stores further instructions that, when executed by the at least one processor, are further configured to: determine a remaining battery capacity threshold for a battery that supplies power to the at least one computing device; and determine that a current level of battery charge of the battery is greater than the remaining battery capacity threshold.

In accordance with a 9th example aspect of the present disclosure, which may be used in combination with any one or more of other aspects described herein (e.g., the 8th aspect), wherein the first request is sent to the remote computing device via a first communication channel, and wherein the non-transitory computer-readable memory stores further instructions that, when executed by the at least one processor, are further configured to: determine a current level of packet loss experienced during communication via the first communication channel; determine a threshold level of packet loss; determine that the current level of packet loss is less than the threshold level; and increase the first distance threshold to generate a second distance threshold greater than the first distance threshold.

In accordance with a 10th example aspect of the present disclosure, which may be used in combination with any one or more of other aspects described herein (e.g., the 8th aspect), wherein the first request is sent to the remote computing device via a first communication channel, and wherein the non-transitory computer-readable memory stores further instructions that, when executed by the at least one processor, are further configured to: determine a current level of packet loss experienced during communication via the first communication channel; determine a threshold level of packet loss; determine that the current level of packet loss is greater than or equal to the threshold level; and decrease the first distance threshold to generate a second distance threshold less than the first distance threshold.

In accordance with a 11th example aspect of the present disclosure, which may be used in combination with any one or more of other aspects described herein (e.g., the 1st aspect), wherein the non-transitory computer-readable memory stores further instructions that, when executed by the at least one processor, are further configured to: generate a second distance threshold by modifying the first distance threshold, wherein the first distance threshold is modified based on at least one of a current battery charge level or a noise level of a communication channel associated with communication between the at least one computing device and the remote computing device.

In accordance with a 12th example aspect of the present disclosure, which may be used in combination with any one or more of other aspects described herein (e.g., the 11th aspect), wherein the non-transitory computer-readable memory stores further instructions that, when executed by the at least one processor, are further configured to: determine, using the GPS, a third location of the vehicle at a third time following the second time; determine, based on the second location and the third location, that the vehicle has traveled a distance that exceeds the second distance threshold; and send a second request to the remote computing device via the communication channel, the second request being a second request to update the encryption key used by the at least one computing device for encrypting data.

Aspects of the subject matter described herein may be useful alone or in combination with one or more other aspects described herein. In a 13th example aspect of the present disclosure, a method of updating encryption keys used by a vehicle comprises: determining, using a GPS, a first location of the vehicle at a first time; determining a first distance threshold stored in memory; determining, using the GPS, a second location of the vehicle at a second time; determining, based on the first location and the second location, that the vehicle has traveled a distance that meets or exceeds the first distance threshold; and sending a first request to a remote computing device via a first communication channel, the first request being a request to update an encryption key used to encrypt data, wherein the first request is sent based at least in part on the distance meeting or exceeding the first distance threshold.

In accordance with a 14th example aspect of the present disclosure, which may be used in combination with any one or more of other aspects described herein (e.g., the 13th aspect), encrypting first data using a first encryption key stored in the non-transitory computer-readable memory to generate first encrypted data; sending the first encrypted data to at least one other computing device over a network; receiving a second encryption key in response to the first request; storing the second encryption key in the non-transitory computer-readable memory; and encrypting second data using the second encryption key to generate second encrypted data.

In accordance with a 15th example aspect of the present disclosure, which may be used in combination with any one or more of other aspects described herein (e.g., the 13th aspect), determining that the GPS system is currently disabled; and sending a notification to the vehicle, wherein the notification requests that the GPS system be enabled.

In accordance with a 16th example aspect of the present disclosure, which may be used in combination with any one or more of other aspects described herein (e.g., the 13th aspect), determining a remaining battery capacity threshold for a battery that supplies power to at least one computing device of the vehicle; determining a current level of battery charge of the battery; and modifying the first distance threshold based at least in part on the remaining battery capacity threshold and the current level of battery charge.

In accordance with a 17th example aspect of the present disclosure, which may be used in combination with any one or more of other aspects described herein (e.g., the 16th aspect), determining that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

In accordance with a 18th example aspect of the present disclosure, which may be used in combination with any one or more of other aspects described herein (e.g., the 13th aspect), determining a current level of packet loss experienced during communication via the first communication channel; and decreasing the first distance threshold to generate a second distance threshold that is less than the first distance threshold based at least in part on the current level of packet loss.

In accordance with a 19th example aspect of the present disclosure, which may be used in combination with any one or more of other aspects described herein (e.g., the 13th aspect), determining a current level of packet loss experienced during communication via the first communication channel; determining a threshold level of packet loss; and decreasing the first distance threshold to generate a second distance threshold that is less than the first distance threshold based at least in part on the current level of packet loss exceeding the threshold level of packet loss.

In accordance with a 20th example aspect of the present disclosure, which may be used in combination with any one or more of other aspects described herein (e.g., the 13th aspect), determining a remaining battery capacity threshold for a battery that supplies power to the at least one computing device; and determining that a current level of battery charge of the battery is greater than the remaining battery capacity threshold.

In accordance with a 21st example aspect of the present disclosure, which may be used in combination with any one or more of other aspects described herein (e.g., the 20th aspect), determining a current level of packet loss experienced during communication via the first communication channel; determining a threshold level of packet loss; determining that the current level of packet loss is less than the threshold level; and increasing the first distance threshold to generate a second distance threshold greater than the first distance threshold.

In accordance with a 22st example aspect of the present disclosure, which may be used in combination with any one or more of other aspects described herein (e.g., the 20th aspect), determining a current level of packet loss experienced during communication via the first communication channel; determining a threshold level of packet loss; determining that the current level of packet loss is greater than or equal to the threshold level; and decreasing the first distance threshold to generate a second distance threshold less than the first distance threshold.

Aspects of the subject matter described herein may be useful alone or in combination with one or more other aspects described herein. In a 23rd example aspect of the present disclosure, a method comprising determining a first distance threshold stored in a non-transitory computer-readable memory associated with a vehicle; determining that the vehicle has traveled a distance that exceeds the first distance threshold; sending a first request to a remote computing device via a first communication channel, the first request being a request for an encryption key used to encrypt data, wherein the first request is sent based at least in part on the distance exceeding the first distance threshold; receiving the encryption key from the remote computing device; encrypting first data using the encryption key to generate first encrypted data; and sending the first encrypted data to a second computing device over a network.

In accordance with a 24th example aspect of the present disclosure, which may be used in combination with any one or more of other aspects described herein (e.g., the 23rd aspect), determining that a GPS system of the vehicle is currently disabled; and sending a notification to the vehicle, wherein the notification requests that the GPS system be enabled.

In accordance with a 25th example aspect of the present disclosure, which may be used in combination with any one or more of other aspects described herein (e.g., the 23rd aspect), determining a remaining battery capacity threshold for a battery that supplies power to at least one computing device of the vehicle; determining a current level of battery charge of the battery; and modifying the first distance threshold based at least in part on the remaining battery capacity threshold and the current level of battery charge.

In accordance with a 26th example aspect of the present disclosure, which may be used in combination with any one or more of other aspects described herein (e.g., the 25th aspect), determining that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

Aspects of the subject matter described herein may be useful alone or in combination with one or more other aspects described herein. In a 27th example aspect of the present disclosure, a system comprises: at least one processor deployed in a vehicle; non-transitory computer-readable memory deployed in the vehicle, the non-transitory computer-readable memory storing instructions that, when executed by the at least one processor are configured to: determine a first distance threshold stored in the non-transitory computer-readable memory; determine that the vehicle has traveled a distance that exceeds the first distance threshold; send a first request to a remote computing device via a first communication channel, the first request being a request for an encryption key used to encrypt data, wherein the first request is sent based at least in part on the distance exceeding the first distance threshold; receive the encryption key from the remote computing device; encrypt first data using the encryption key to generate first encrypted data; and send the first encrypted data to a second computing device over a network.

In accordance with a 28th example aspect of the present disclosure, which may be used in combination with any one or more of other aspects described herein (e.g., the 27th aspect), wherein the non-transitory computer-readable memory stores further instructions that, when executed by the at least one processor, are further configured to: determine that a GPS system of the vehicle is currently disabled; and send a notification to the vehicle, wherein the notification requests that the GPS system be enabled.

In accordance with a 29th example aspect of the present disclosure, which may be used in combination with any one or more of other aspects described herein (e.g., the 27th aspect), wherein the non-transitory computer-readable memory stores further instructions that, when executed by the at least one processor, are further configured to: determine a remaining battery capacity threshold for a battery that supplies power to at least one computing device of the vehicle; determine a current level of battery charge of the battery; and modify the first distance threshold based at least in part on the remaining battery capacity threshold and the current level of battery charge.

In accordance with a 30th example aspect of the present disclosure, which may be used in combination with any one or more of other aspects described herein (e.g., the 29th aspect), wherein the non-transitory computer-readable memory stores further instructions that, when executed by the at least one processor, are further configured to: determine that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

Aspects of the subject matter described herein may be useful alone or in combination with one or more other aspects described herein. In a 31st example aspect of the present disclosure, a system comprises: a means for determining a first distance threshold stored in a non-transitory computer-readable memory associated with a vehicle; a means for determining that the vehicle has traveled a distance that exceeds the first distance threshold; a means for sending a first request to a remote computing device via a first communication channel, the first request being a request for an encryption key used to encrypt data, wherein the first request is sent based at least in part on the distance exceeding the first distance threshold; a means for receiving the encryption key from the remote computing device; a means for encrypting first data using the encryption key to generate first encrypted data; and a means for sending the first encrypted data to a second computing device over a network.

In accordance with a 32nd example aspect of the present disclosure, which may be used in combination with any one or more of other aspects described herein (e.g., the 31st aspect), the system further comprising a means for determining that a GPS system of the vehicle is currently disabled; and a means for sending a notification to the vehicle, wherein the notification requests that the GPS system be enabled.

In accordance with a 33rd example aspect of the present disclosure, which may be used in combination with any one or more of other aspects described herein (e.g., the 31st aspect), the system further comprising a means for determining a remaining battery capacity threshold for a battery that supplies power to at least one computing device of the vehicle; a means for determining a current level of battery charge of the battery; and a means for modifying the first distance threshold based at least in part on the remaining battery capacity threshold and the current level of battery charge.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
at least one computing device deployed in a vehicle;
a global positioning system (GPS) deployed in the vehicle; and
non-transitory computer-readable memory deployed in the vehicle, the non-transitory computer-readable memory storing instructions that, when executed by at least one processor are configured to:
  determine, using the GPS, a first location of the vehicle at a first time, wherein the first time corresponds to receipt, by the vehicle, of a first encryption key;
  determine a first distance threshold;
  determine, using the GPS, a second location of the vehicle at a second time;
  determine, based on the first location and the second location, that the vehicle has traveled a distance that exceeds the first distance threshold; and
  send a first request to a remote computing device, the first request being a request to update the first encryption key used by the at least one computing device for encrypting data, wherein the first request is triggered by the distance traveled by the vehicle exceeding the first distance threshold.

2. The system of claim 1, wherein the non-transitory computer-readable memory stores further instructions that, when executed by the at least one processor, are further configured to:
  encrypt first data using the first encryption key stored in the non-transitory computer-readable memory to generate first encrypted data;
  send the first encrypted data to at least one other computing device over a network;
  receive a second encryption key in response to the first request;
  store the second encryption key in the non-transitory computer-readable memory; and
  encrypt second data using the second encryption key to generate second encrypted data.

3. The system of claim 1, wherein the non-transitory computer-readable memory stores further instructions that, when executed by the at least one processor, are further configured to:
  determine that the GPS system is currently disabled; and send a notification to the at least one computing device deployed in the vehicle, wherein the notification requests that the GPS system be enabled.

4. The system of claim 1, wherein the non-transitory computer-readable memory stores further instructions that, when executed by the at least one processor, are further configured to:
   determine a remaining battery capacity threshold for a battery that supplies power to the at least one computing device;
   determine a current level of battery charge of the battery; and
   modify the first distance threshold based at least in part on the remaining battery capacity threshold and the current level of battery charge.

5. The system of claim 4, wherein the non-transitory computer-readable memory stores further instructions that, when executed by the at least one processor, are further configured to:
   determine that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

6. The system of claim 1, wherein the first request is sent to the remote computing device via a first communication channel, and wherein the non-transitory computer-readable memory stores further instructions that, when executed by the at least one processor, are further configured to:
   determine a current level of packet loss experienced during communication via the first communication channel; and
   decrease the first distance threshold to generate a second distance threshold that is less than the first distance threshold based at least in part on the current level of packet loss.

7. The system of claim 1, wherein the first request is sent to the remote computing device via a first communication channel, and wherein the non-transitory computer-readable memory stores further instructions that, when executed by the at least one processor, are further configured to:
   determine a current level of packet loss experienced during communication via the first communication channel;
   determine a threshold level of packet loss; and
   decrease the first distance threshold to generate a second distance threshold that is less than the first distance threshold based at least in part on the current level of packet loss exceeding the threshold level of packet loss.

8. The system of claim 1, wherein the non-transitory computer-readable memory stores further instructions that, when executed by the at least one processor, are further configured to:
   determine a remaining battery capacity threshold for a battery that supplies power to the at least one computing device; and
   determine that a current level of battery charge of the battery is greater than the remaining battery capacity threshold.

9. The system of claim 8, wherein the first request is sent to the remote computing device via a first communication channel, and wherein the non-transitory computer-readable memory stores further instructions that, when executed by the at least one processor, are further configured to:
   determine a current level of packet loss experienced during communication via the first communication channel;
   determine a threshold level of packet loss;
   determine that the current level of packet loss is less than the threshold level; and
   increase the first distance threshold to generate a second distance threshold greater than the first distance threshold.

10. The system of claim 8, wherein the first request is sent to the remote computing device via a first communication channel, and wherein the non-transitory computer-readable memory stores further instructions that, when executed by the at least one processor, are further configured to:
    determine a current level of packet loss experienced during communication via the first communication channel;
    determine a threshold level of packet loss;
    determine that the current level of packet loss is greater than or equal to the threshold level; and
    decrease the first distance threshold to generate a second distance threshold less than the first distance threshold.

11. The system of claim 1, wherein the non-transitory computer-readable memory stores further instructions that, when executed by the at least one processor, are further configured to:
    generate a second distance threshold by modifying the first distance threshold, wherein the first distance threshold is modified based on at least one of a current battery charge level or a noise level of a communication channel associated with communication between the at least one computing device and the remote computing device.

12. The system of claim 11, wherein the non-transitory computer-readable memory stores further instructions that, when executed by the at least one processor, are further configured to:
    determine, using the GPS, a third location of the vehicle at a third time following the second time;
    determine, based on the second location and the third location, that the vehicle has traveled a distance that exceeds the second distance threshold; and
    send a second request to the remote computing device via the communication channel, the second request being a second request to update the encryption key used by the at least one computing device for encrypting data.

13. A method of updating encryption keys used by a vehicle, the method comprising:
    determining, using a global positioning system (GPS), a first location of the vehicle at a first time, wherein the first time corresponds to receipt, by the vehicle, of a first encryption key;
    determining a first distance threshold stored in memory;
    determining, using the GPS, a second location of the vehicle at a second time;
    determining, based on the first location and the second location, that the vehicle has traveled a distance that meets or exceeds the first distance threshold; and
    sending a first request to a remote computing device via a first communication channel, the first request being a request to update the first encryption key used to encrypt data, wherein the first request is triggered by the distance traveled by the vehicle meeting or exceeding the first distance threshold.

14. The method of claim 13, further comprising:
encrypting first data using the first encryption key stored in a non-transitory computer-readable memory to generate first encrypted data;
sending the first encrypted data to at least one other computing device over a network;
receiving a second encryption key in response to the first request;
storing the second encryption key in the non-transitory computer-readable memory; and
encrypting second data using the second encryption key to generate second encrypted data.

15. The method of claim 13, further comprising:
determining that the GPS is currently disabled; and
sending a notification to the vehicle, wherein the notification requests that the GPS be enabled.

16. The method of claim 13, further comprising:
determining a remaining battery capacity threshold for a battery that supplies power to at least one computing device of the vehicle;
determining a current level of battery charge of the battery; and
modifying the first distance threshold based at least in part on the remaining battery capacity threshold and the current level of battery charge.

17. The method of claim 16, further comprising:
determining that the current level of battery charge is less than or equal to the remaining battery capacity threshold, wherein modifying the first distance threshold comprises reducing the first distance threshold by a first amount based at least in part on the current level of battery charge being less than or equal to the remaining battery capacity threshold.

18. A method comprising:
determining a first distance threshold stored in a non-transitory computer-readable memory associated with a vehicle;
determining that the vehicle has traveled a distance that meets or exceeds the first distance threshold;
sending a first request to a remote computing device via a first communication channel, the first request being a request for an encryption key used to encrypt data, wherein the first request is triggered by the distance traveled by the vehicle, which is tracked using global positioning system (GPS) location information, exceeding the first distance threshold;
receiving the encryption key from the remote computing device;
encrypting first data using the encryption key to generate first encrypted data; and
sending the first encrypted data to a second computing device over a network.

19. The method of claim 18, further comprising:
determining that a GPS system of the vehicle is currently disabled; and
sending a notification to the vehicle, wherein the notification requests that the GPS system be enabled.

20. The method of claim 18, further comprising:
determining a remaining battery capacity threshold for a battery that supplies power to at least one computing device of the vehicle;
determining a current level of battery charge of the battery; and
modifying the first distance threshold based at least in part on the remaining battery capacity threshold and the current level of battery charge.

\* \* \* \* \*